Patented May 16, 1933

1,909,193

UNITED STATES PATENT OFFICE

FERNANDO SOMOZA VIVAS, OF PELHAM MANOR, NEW YORK, ASSIGNOR TO SAFETY PRODUCTS, INC., OF NEW YORK, N. Y., A CORPORATION OF NEW YORK

CELLULOSIC MATERIAL AND PROCESS OF PRODUCING THE SAME

No Drawing. Application filed April 23, 1932. Serial No. 607,231.

The invention relates to wallboard and has as an object the provision of a wallboard which is fire and moisture resistant.

It is a further object of the invention to provide a process for producing wallboard which may be carried out by present equipment found in certain wallboard factories.

Experience with the processes described and claimed in my former Patents Nos. 1,839,135 and 1,839,136 dated December 29, 1931, shows that the cost of the chemicals used therein is excessive for the purpose of providing a process which will be sufficiently cheap to appeal to manufacturers. Since one of the main objects in this class of inventions is to provide a wallboard which is cheap enough to be used on dwellings of moderate cost and thereby prevent danger of fire especially when situated in the country without fire protection, the present invention is designed to reduce the cost below the cost of prior processes and at the same time to produce a board which will be stronger and which will absorb very little moisture from either the atmosphere or direct contact with water.

A difficulty found with the processes of my prior patents referred to, in common with all other processes of which I am aware, is that at the temperature used for drying the material in many manufacturing establishments, namely, from 375° F. to 400° F., some of the chemical compounds used in the preparation of the wallboard have decomposed, not only injuring the fireproofing properties of the product but damaging the apparatus.

In the processes of my prior patents, ammonium sulphate is used, which is a very efficient fireproofing agent, but at the named temperatures when the boards are dried by pressing with heated plates, this chemical is decomposed into ammonia gas and sulphurous acid, which has the effect of rapidly rusting the pressing plates and of discoloring the product so as to make the same non-saleable. Moreover, the boric acid used in the prior processes is also decomposed at the named temperatures and its fireproofing properties are lost. Furthermore, the waterproofing compounds of the prior patents become charred at the named temperature, further discoloring the board.

Therefore the processes of my former patents while valuable for use in plants where the material is dried by means of hot air at lower temperatures, yet are not useable with the expensive equipment now in possession of most manufacturers.

It is an object of the present invention to avoid the above named difficulties and at the same time to produce a cheaper and stronger product.

In the carrying out of the present process there are mixed for each gallon of water, the following substances preferably in the amounts named:

$MgCl_2$ (12 ounces) fuses at_____1305° F.
$MgSO_4$ (12 ounces) fuses above____2400° F.
$NaHCO_3$ (12 ounces) decomposes at_519° F.
$NaB_4O_7$ (2 ounces) fuses at_____1350° F.
$NaCl$ (2 ounces) fuses at_____1480° F.

Desirably water is added to the dry materials.

Opposite each of the compounds in the above formula there is noted its fusing point. It will be seen that all of the substances used in this formula are stable above 400° F., the highest temperature commonly used in the hot press drying method.

Best results are obtained by using water at a temperature not over 120° F. to make a perfect solution, which will have a specific gravity of substantially 1,150. This solution is used in the beaters in preparation of the pulp instead of the usual water therein.

When the material is ready to be run to the forming apparatus, there is added thereto an amount of the following emulsion equal to 4% of the weight of the dry pulp. The emulsion is prepared by mixing with wax, 75 parts, and rosin 25 parts, 20 parts of $Na_2CO_3$ dissolved in 80 parts of water.

Should this emulsion be added to the pulp before the named fireproofing formula is applied, the fibres will not be able to absorb the fireproofing compounds.

After treatment of the stock with the wax and rosin emulsion, the board is formed in the usual manner.

The salts named are each valuable for fireproofing purposes, producing the result because of the combination of compounds of gradually higher fusing points.

Should it be attempted to use magnesium chloride with magnesium sulphate in solution without the presence of bicarbonate of soda, the magnesium compounds will be precipitated. But in the presence of bicarbonate of soda, the magnesium compounds can both be held in solution in combination.

The sodium chloride fusing at high temperatures has the function of forming a glaze over the fibres of the wallboard and thereby preventing conflagration by causing them to resist oxidation. At the low temperatures of ignition, the bicarbonate of soda is decomposed producing NaOH and carbon dioxide, which latter is well known to extinguish fires, but the sodium hydrate thus liberated is destructive to the fibre of the material, which destructive effect is prevented by the presence of sodium chloride. The magnesium chloride assists in this action.

The wax mentioned is any one of the usual waxes as paraffin, beeswax, Montan, carnauba, ozokerite, or the like.

The invention has been devised particularly for use in the manufacture of wallboard but is applicable to other products composed of cellulose fibre and manufactured from pulp.

Minor changes in the steps of the process or in the proportions of parts may be made within the scope of the appended claims without departing from the spirit of the invention.

I claim:

1. The process of producing cellulose fibre material which comprises beating a pulp of cellulose fibres in a solution of substantially the indicated proportions of the following compounds: namely, $MgCl_2$ _____ 12 oz.
$MgSO_4$ _____ 12 oz.
$NaHCO_3$ _____ 12 oz.
$NaB_4O_7$ _____ 2 oz.
$NaCl$ _____ 2 oz.
Water _____ 1 gallon and shaping and drying the pulp in the desired form.

2. The process of producing cellulose fibre material which comprises beating a pulp of cellulose fibres in a solution of substantially the indicated proportions of the following compounds: namely, $MgCl_2$ _____ 12 oz.
$MgSO_4$ _____ 12 oz.
$NaHCO_3$ _____ 12 oz.
$NaB_4O_7$ _____ 2 oz.
$NaCl$ _____ 2 oz.
Water _____ 1 gallon adding to the prepared stock an emulsion of wax and rosin, and shaping and drying the pulp in the desired form.

3. The process of producing cellulose fibre material which comprises beating a pulp of cellulose fibres in a solution of substantially the indicated proportions of the following compounds: namely, $MgCl_2$ _____ 12 oz.
$MgSO_4$ _____ 12 oz.
$NaHCO_3$ _____ 12 oz.
$NaB_4O_7$ _____ 2 oz.
$NaCl$ _____ 2 oz.
Water _____ 1 gallon adding to the prepared stock an emulsion of wax and rosin in a solution of $Na_2CO_3$ in water.

4. The process of manufacturing wallboard which comprises beating a pulp of cellulose fibres in a solution of substantially the indicated proportions of the following compounds: namely, $MgCl_2$ _____ 12 oz.
$MgSO_4$ _____ 12 oz.
$NaHCO_3$ _____ 12 oz.
$NaB_4O_7$ _____ 2 oz.
$NaCl$ _____ 2 oz.
Water _____ 1 gallon forming a sheet of the thus prepared pulp and pressing the sheet at a temperature between 300° and 500° F.

5. The process of manufacturing wallboard which comprises beating a pulp of cellulose fibres in a solution of substantially the indicated proportions of the following compounds: namely, $MgCl_2$ _____ 12 oz.
$MgSO_4$ _____ 12 oz.
$NaHCO_3$ _____ 12 oz.
$NaB_4O_7$ _____ 2 oz.
$NaCl$ _____ 2 oz.
Water _____ 1 gallon adding to the thus prepared stock an emulsion of wax and rosin, forming a sheet of the thus prepared pulp and pressing the sheet at a temperature between 300° F. and 500° F.

6. A composition of matter for addition to cellulose fibre pulp in the manufacture of flame-resistant material therefrom comprising the indicated proportions of the following compounds: namely, $MgCl_2$ _____ 12 oz.
$MgSO_4$ _____ 12 oz.
$NaHCO_3$ _____ 12 oz.
$NaB_4O_7$ _____ 2 oz.
$NaCl$ _____ 2 oz.

In witness whereof I have hereunto set my hand this 22nd day of April 1932.

FERNANDO SOMOZA VIVAS.